March 10, 1953 F. H. NICOLL 2,631,259

COLOR TELEVISION

Filed July 12, 1950 2 SHEETS—SHEET 1

INVENTOR
Frederick H. Nicoll
BY
ATTORNEY

March 10, 1953 F. H. NICOLL 2,631,259

COLOR TELEVISION

Filed July 12, 1950 2 SHEETS—SHEET 2

INVENTOR
Frederick H. Nicoll
BY
[signature]
ATTORNEY

Patented Mar. 10, 1953

2,631,259

UNITED STATES PATENT OFFICE 2,631,259

COLOR TELEVISION

Frederick H. Nicoll, Princeton, N. J., assignor to Radio Corporation of America, a corporation of Delaware Application July 12, 1950, Serial No. 173,273

15 Claims. (Cl. 315—12)

This invention relates to methods of and apparatus for obtaining control signals corresponding to the position of a beam in a cathode ray tube and to the selection of one of a plurality of signals in accordance with said control signals.

In many applications of cathode ray tubes it is essential that the time of arrival of an electron beam at a predetermined point in the raster coincide with the time of application of a given signal or type of signal to an electrode adapted to control the intensity of the beam. For example, in a monochrome television system the transmitted video signals represent variations in light intensity of successive elemental areas as each horizontal line of the raster of the pick-up tube is scanned. If the image represented by these video signals is to be reproduced without aberration, the beam in the kinescope at the receiver must strike the elemental area of the image corresponding to the elemental area represented by the video signal being received at that instant. If the scanning at the pick-up tube as well as the scanning at the kinescope are linear, no aberration will be produced.

In a practical case, however, the scanning at the pick-up tube and the receiving tube is not inherently linear. If, however, control signals are generated that are indicative of the position of the beam on the raster they may be employed so as to make the scanning linear. This principle is applicable to both the pick-up tube at the transmitter and the kinescope at the receiver.

According to one previously suggested method as described in the U. S. Patent No. 2,385,563 filed January 30, 1943, in the name of Beers, linear scanning may be accomplished by mounting a grid structure of uniformly spaced vertical current conducting elements between the source of electrons and the target being scanned. Control signals are generated when the scanning beam strikes the vertical elements of the grid. The frequency of these control signals is proportional to the velocity of the beam. Therefore, an indication of the non-linearity in the scanning may be obtained by comparing the frequency of the signals with a standard frequency that would be produced if the scanning were linear.

In certain other applications of cathode ray tubes it is necessary that a selected one of a plurality of continuously available signals be applied so as to control the intensity of a given beam of electrons whenever that beam strikes certain predetermined points on a target. It is not, therefore, necessary that the beam reach a particular point on the target at any particular instant, but rather that the proper signal be employed to control the intensity of the beam when it arrives at certain predetermined points. For example, methods of reproducing colored images have already been proposed wherein use is made of cathode ray tubes having targets comprised of uniformly spaced vertical strips of phosphor. Each successive strip reproduces light of different color when struck by a beam of electrons. The strips are arranged so that the sequence of colors produced is separated as the strips are scanned by a beam of electrons.

In accordance with one feature of this invention, a grid structure having elements in registry with the phosphor strips that produce red is inserted between the target and the electron gun. The signals supplied as a beam scans across the grid can be employed to permit the red video signals to be applied so as to control the intensity of the scanning beam. These signals can be delayed by appropriate times and employed so as to permit the blue and green video signals to successively control the intensity of the appropriate scanning beam. Three grids could be employed, each corresponding to the phosphor strips that produce a different color. The control signals supplied by each grid are employed to permit a corresponding video signal to modulate the intensity of the scanning beam.

In either of the applications given above, the beam producing the control signals is intensity modulated. Therefore, when the beam intensity is very low, the control signals may be too small to be of practicable use. A minimum level of intensity could be maintained at all times so as to insure the generation of control signals of usable amplitude, but this limits the range of intensity modulation of the beam. For example, if the beam is being used to pick up video signals or to reproduce an image from video signals, the contrast or the difference between the whitest white and the blackest black is reduced. Furthermore, if the control signals are to be used for triggering purposes, as in the case of the color tube described above, the variation in amplitude changes the phase of the triggering.

If the control signals are generated as a result of the difference between the secondary emission ratios of the grid elements and the target areas in between these elements, their amplitude increases as the velocity of the electrons in the beam is lowered provided the velocity stays within a usable range. In most applications the velocity of the beam of electrons lies in the upper portion of the usable range and the difference in secondary emission ratios is relatively low. Accordingly, the control signals generated by such a beam are smaller than could be obtained from a beam of lower velocity.

It is therefore an object of this invention to intensity modulate a beam of electrons with a particular signal selected in accordance with the position of the beam on its raster.

It is a further object of this invention to generate control signals that are a function of the position of a beam of electrons on its raster and that are independent of intensity modulations on the beam.

Another purpose of this invention is to provide improved means for generating control signals as a function of the position of a beam on a raster in such manner that the signals so generated are of maximum amplitude.

In accordance with another object of this invention, improved apparatus is provided whereby the scanning linearity is controlled by signals that indicate the position of the beam on the raster.

Another object of this invention is to provide an improved apparatus for reproducing colored images in which a video signal representing a given component color is applied so as to modulate the intensity of a beam of electrons when said beam is at predetermined points of its scanning raster.

Another object of the invention is to provide an improved apparatus for generating control signals as a function of a beam position on the raster in such manner that the control signals can be separated from the other signals on a frequency basis.

The above difficulties may be completely overcome and the above objectives therefore achieved by employing apparatus embodying the principles of this invention wherein two beams of electrons are used, one to bear the intelligence and the other to generate the control signals. The electrons in the beam that generate the control signals travel at a lower velocity than the electrons in the intelligence bearing beam. As the electron beams are subjected to the same deflection fields, the beam that generates the control signals scans a larger raster than the other beam. If a target comprised of a grid such as previously described is positioned so as to intercept the beams of electrons, the frequency of the signal generated by the control signal generating beam as it scans across the grid is higher than the frequency of the signals generated by the information bearing beam as it scans across the grid. Therefore, the control signals can be separated from any other signals produced on a frequency basis. At the same time, because the control signal generating beam is not modulated, the signals produced by it are of constant amplitude. This is advantageous whether the signals are to be employed for producing linear scanning or for keying purposes.

Between the grid target and an information sensitive target there is an electron barrier which may be comprised of aluminum foil. This barrier is of sufficient thickness to prevent the slower moving electrons of the control signal generating beam from passing therethrough and yet thin enough to permit the faster moving electrons in the intelligence bearing beam to reach the intelligence sensitive target. The intelligence sensitive target, for example, may be a photocathode, or it may be a phosphorized screen such as used in a kinescope. In this way, the intensity of the unmodulated control signal generating beam can be made high without in any way affecting the contrast ratio of the reproduced image in the case of a kinescope in a receiver, or affecting the amplitude range of the signals in the intelligence bearing beam in the case of a pick-up tube.

The manner in which the afore-mentioned objects may be achieved in accordance with the concepts of this invention may be further appreciated from a detailed consideration of the drawings in which.

Figure 1A:
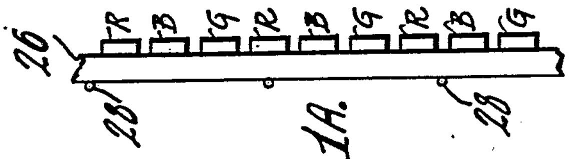
Figure 1A illustrates a top view of the target employed in the cathode ray tube of Figure 1.
Figure 1:
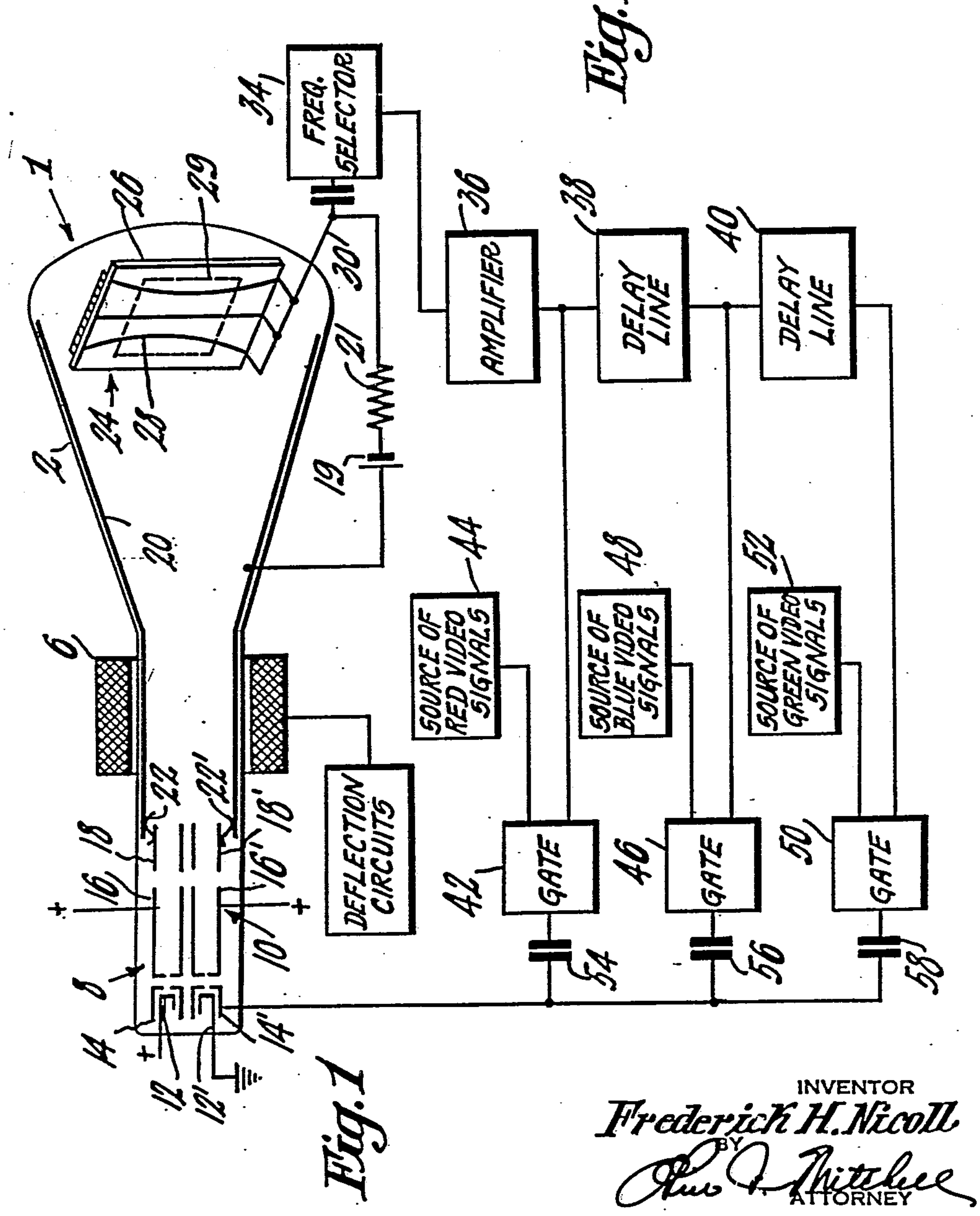
Figure 1 illustrates an embodiment of the invention wherein a single carbon line is associated with each phosphor strip of a single color.

Figure 1 illustrates an apparatus for generating control signals in accordance with one feature of this invention and for employing them in accordance with another feature of this invention for keying the proper video signal onto an intensity control element of a cathode ray tube employed for reproducing colored images. Although the apparatus for generating the control signals is described in connection with a kinescope adapted to reproduce images in color, it will be understood that it could be employed in monochrome kinescopes or in television pick-up tubes.

A special cathode ray tube 1 is comprised of an evacuated envelope 2. A standard set of deflection coils 6 is provided. Two separate electron guns generally indicated by the numerals 8 and 10 respectively are employed in a novel manner. The electron gun 8 is comprised of a source of electrons such as cathode 12, an intensity control grid 14, an accelerating and focusing electrode 16 and a second anode 18. The latter cylinder is electrically connected to the wall coating of current conducting material 20 by means of springs 22 in a manner well known to those skilled in the art. The electron gun 10 is of similar construction and, for the sake of simplicity, its component parts are indicated by the same numerals primed as were employed in the description of electron gun 8. It will be noted that cathode 12 of the electron gun 8 is connected to a source of positive potential and that the cathode 12′ of the electron gun 10 is connected to ground. Therefore, the electrons in the electron beam projected by the electron gun 8 will travel at a lower speed than those projected in the beam of the electron gun 10.

The beams of electrons projected by the guns 8 and 10 are directed towards a target generally indicated by a numeral 24. Looking at a cross section of the target, the center portion 26 is an electron barrier comprised of a thin aluminum foil. On the side of the foil 26 that is remote from the electron guns 8 and 10 are mounted vertical strips of phosphors. If the cathode ray tube is to be employed in a three color system, one strip of phosphor is adapted to emit red light when struck by a beam of electrons, the adjacent phosphor emits green light, and the next phosphor blue light. The sequence is then repeated. On the side of the aluminum foil 26 that is toward the guns 8 and 10, a grid structure comprised of carbon lines such as indicated by the numeral 28 is impressed. Of course, the grid 28 could be spaced from the aluminum foil, but this would make it difficult to obtain proper registry. In this particular embodiment, carbon lines that form the grid 28 are electrically connected to a common output lead 30. Of course, the grid 28 and the foil 26 could be made of other materials having different secondary emission ratios. The dotted rectangle 29 indicates the size of the raster scanned by the beam of electrons projected from the electron gun 10. The raster scanned by the beam of electrons projected by the electron gun 8 extends beyond the dotted rectangle.

A battery 19 is connected in series with a load resistor 21 between the wall coating 20 and the grid 28. The currents of secondary electrons are thus returned to the grid 28 and aluminum foil 26 via a load resistor 21. The variations in potential thus produced across the load resistor 21 are available at the output lead 30.

A frequency selector 34 is connected so as to receive the signals generated by the electrons of secondary emission. It is tuned so as to pass the synchronizing signals produced by the electron beam projected by the gun 8 as it traverses the separate conductors in the grid 28. The frequency selector 34 may be a filter or may be a tuned amplifier or any other frequency selective device known to those skilled in the art.

After further amplification in an amplifier 36, the synchronizing signals selected by the frequency selector 34 are applied to delay lines 38 and 40 in series. The synchronizing signals supplied by the amplifier 36 are applied directly to a gate 42 so as to render it capable of passing the red video signals available from a source 44. After passing through the delay line 38 the synchronizing signals are applied to a gate 46 so as to render it capable of passing blue video signals from a source 48. Similarly, after passing through the delay line 40, the synchronizing signals are applied to a gate 50 so as to render it capable of passing the green video signals from a source 52. The gates 42, 46 and 50 may be of the type illustrated on page 379 of the book entitled "Waveforms" which is a part of the Radiation Laboratories Series produced by the Massachusetts Institute of Technology. These gates are coupled via suitable condensers 54, 56 and 58 to the intensity control grid 14' of the electron gun 10.

*Operation*

The overall operation of the apparatus of Figure 1 may be described as follows. It will be remembered that the electrons in the beam projected by the electron gun 10 travel at a greater velocity than the electrons projected by the electron gun 8. Therefore, if the aluminum foil 26 is sufficiently thick, the electrons from the gun 10 will pass through it so as to stimulate the phosphor strips mounted on the other side. However, the electrons in the beam projected by the electron gun 8 will not have the sufficient combination of velocity and intensity to penetrate the aluminum foil 26 so as to stimulate the phosphor strips. Where, as was previously done, the same electron beam is employed for stimulating the phosphor strips and for generating the synchronizing signals, it can be readily seen that the amount of secondary emission produced by the grid such as indicated by the numeral 28 will vary with the video modulations applied to the beam. Furthermore, it will be apparent that the synchronizing signals produced by a single beam will have a very low value when the modulation of the beam is such as to reproduce black. Under such conditions, very few electrons, comparatively speaking, are in the beam, and the number of secondary electrons emitted from the grid 28 would thus be greatly decreased. Therefore, where a single beam is used to perform both functions, the number of electrons occurring when the signal is black must be increased in order to develop a synchronizing signal of sufficient amplitude. This effectively reduces the contrast ratios in the reproduced image, as the black level is no longer below the visual cut off of the cathode ray tube. However, by employing a second beam that is not intensity modulated, the signal produced by the secondary emission from the grid 28 will be of a conveniently large and constant amplitude. The fact that they are of constant amplitude aids in triggering the gates 42, 46 and 50 in uniform fashion.

One other advantage is derived from the use of a second beam comprised of slower moving electrons for the generation of the synchronizing signals. Within a practical range of electron velocities, the difference in the secondary emission ratios of the carbon conductors that form the grid 28 and the aluminum foil 26 increases as the speed of the electrons in the scanning beam decreases. This means that the synchronizing signals produced by the scanning of the beam of the electron gun 8 have a greater amplitude than the unused signals generated by the scanning of the beam of the electron gun 10.

In the particular arrangement, the number of vertical carbon conductors in the gird 28 is equal to the number of vertical strips of red phosphor on the outside of the aluminum foil 26. Therefore, the spacing between the carbon conductors is greater than the spacing between the vertical strips of red phosphor. However, they are placed so that the beam from the gun 8 strikes one of the vertical carbon conductors when the beam from the gun 10 is stimulating a red phosphor strip. In the very center of the target 24 the vertical grid conductors will substantially be in alignment with the red phosphor strips. However, as they approach the outer edges of the target 24, the vertical carbon conductors are more and more displaced from their corresponding red strips. The outermost conductor of the grid 28 lies at the extreme vertical edges of the raster scanned by the beam from the gun 8, and the outermost vertical edges of the raster scanned by the beam from the gun 10 as indicated by the dotted rectangle 29. Compensation can be made for the fact that the deflection of one beam may not be quite proportional to the deflection of the other by suitably locating the conductors of the grid 28 and by curving them. Thus, the beam from the gun 10 must strike the correct red phosphor strip at the same time the beam from the gun 8 strikes a corresponding conductor in the grid 28.

The synchronizing signal developed as described above is applied directly to the gate 42 so as to render it capable of passing the red video signals from the source 44 to the grid 14' of the electron gun 10. Therefore, when the gate 42 is thus conditioned, the electron beam projected by the electron gun 10 is modulated in accordance with the intensity of the red video signals and will strike one of the vertical strips of red phosphor. If the scanning of the electron beam as it passes from one red phosphor strip to another is substantially linear, the delays provided by the delay lines 38 and 40 are both equal to one-third the scanning interval required for the beam to pass from one red phosphor to another. In this way, the synchronizing signals supplied by the red delay line 38 will key the gate 46 when the electrons from the gun 10 are striking the blue phosphor strips so that the blue video signals are applied to the grid 14' so as to modulate the beam. In a similar fashion, the gate 50 is keyed when the beam from the gun 10 is opposite the green phosphor strips.

Figures 2, 2A, 3:
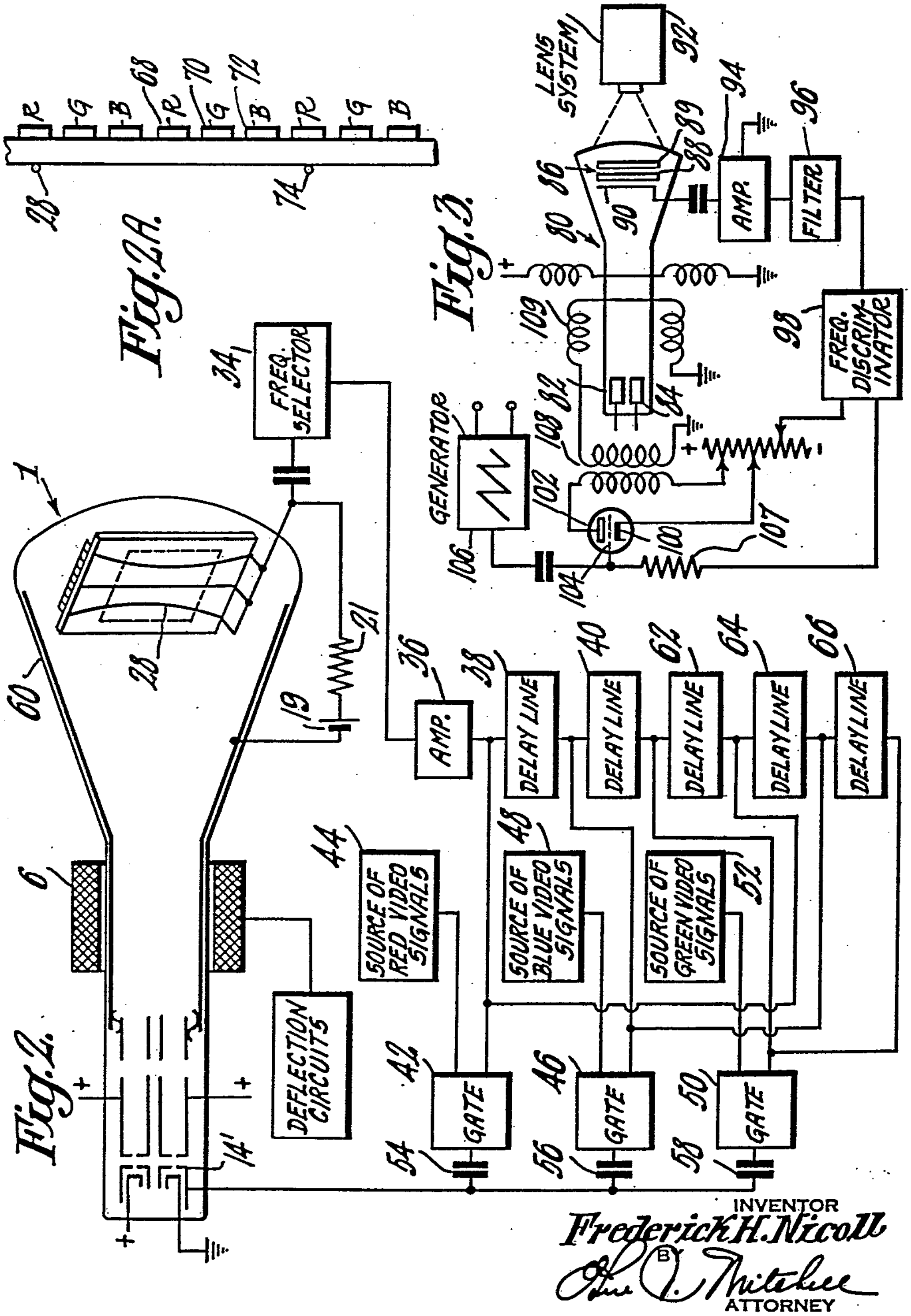
Figure 2 illustrates an embodiment of the invention wherein a carbon line is associated with every other phosphor line of a given color.
Figure 2A illustrates a top view of the target employed in a cathode ray tube of Figure 2.
Figure 3 illustrates an apparatus for controlling the scanning linearity of a beam of electrons in accordance with this invention.

Figure 2 illustrates a form of the invention wherein the number of vertical conductors of the grid 28 is not equal to the number of red phosphor strips. The number of vertical carbon strips in the grid 28 that is employed depends upon the linearity of the horizontal scanning. If the scanning were absolutely linear, only one vertical grid wire would be required at the beginning of each horizontal line. But, in a practical case, the linearity of the horizontal scanning is such that a plurality of vertical conductors would be required. In the arrangement of Figure 2, the number of vertical conductors in the grid 28 is half the number of red phosphors. A top view of the central portion of a target that may be employed in this system is illustrated in Figure 2A. For convenience of illustration, the target is one in which the difference in the velocities of the electron of the two beams is not large. Therefore, the vertical conductors in this central portion of the grid 28 are located near the center of every other red vertical phosphor strip. The details of the cathode ray tube 60 are otherwise the same as those of the cathode ray tube 2 of Figure 1. For purposes of convenience, those components that perform the same function in the arrangement of Figure 2 as they did in Figure 1 will be indicated by corresponding numerals. The circuit arrangement is entirely the same as that of Figure 1 with the exception that additional delay lines 62, 64 and 66 are connected in series with the delay lines 38 and 40 of Figure 1. The output of the delay line 62 is applied to trigger the gate 42, the output of the delay line 64 is applied so as to trigger the gate 46, and the output of the delay line 66 is applied so as to trigger the gate 50. When the beam projected by the gun 8 strikes one of the vertical conductors of the grid 28 the beam projected by the electron gun 10 is impinging upon a red phosphor strip and, in accordance with the operation discussed above, the gate 42 permits the red video signals to be applied to the grid 14'. When, however, the beam from the gun 10 strikes the next red phosphor strip, there is no corresponding vertical conductor in the grid 28 for the beam from the electron gun 8 to strike and, accordingly, no new synchronizing signal is generated. However, the original synchronizing signal produced when the beam from the gun 86 passed the preceding vertical conductor has been delayed by the delay line 62 so that it arrives at the gate 42 when the beam from the gun 10 is opposite the intermediate red phosphor strip 68. In a similar fashion, the delay line 64 supplies the synchronizing signal to the gate 46 when the beam from the electron gun 10 is opposite the second green phosphor strip 70. The synchronizing signal from the delay line 66 arrives at the gate 50 at the same time that the beam from the electron gun 10 strikes the second blue phosphor strip 72. This sequence of operations is then repeated as the beam from the electron gun 8 generates a new synchronizing signal when it strikes a vertical grid conductor 74. It is quite apparent that the number of vertical conductors in the grid 28 can be further reduced if more delay lines are added in series with the ones shown in Figure 2 and the corresponding connections are made to the gates 42, 46 and 50.

Figure 3 illustrates a television pick up tube in which the control signals are generated and employed to control the linearity of the horizontal scanning in accordance with the principles of this invention. The pick up tube 80 is therefore provided with two electron guns 82 and 84. The electrons in the beam projected by the gun 82 travel at a lower velocity than electrons projected by the gun 84. After passing through common focusing and deflection fields, the beams impinge upon a target generally indicated by the numeral 86. The target 86 is comprised of an aluminum foil 88 having a grid structure 90 of carbon lines printed on the inner surface thereof, as previously described in connection with Figure 1. On the opposite side of the aluminum foil 88 a photocathode 89 is mounted which, in accordance with well known principles, establishes a charge pattern that corresponds to the light intensity variations of the image focused thereon by an optical system 92. The beam of electrons projected by the gun 84 has sufficient velocity to penetrate the aluminum foil 88 and to have its intensity modulated in accordance with the charge pattern developed by the photocathode 89. On the other hand, the electrons projected by the gun 82 do not penetrate to the photocathode 89 and therefore do not remove any of the charge present thereon. However, they do cross the grid 90 and therefore generate control signals in a manner similar to that described in connection with Figure 1.

The signals generated by the grid 90 are amplified by an amplifier 94 and the control signals are separated on a frequency basis as previously described by a filter 96. The output of the filter is applied to a frequency discriminator 98 that may be the same as that illustrated in the Beers patent. Any type of frequency discriminator might be employed in which the polarity of the D. C. output and the magnitude of this output are determined by the departure of the control frequency supplied by the filter 96 from a standard. The standard frequency may be established by a tuned circuit included therein. The output of the frequency discriminator is applied between the cathode 100 of a deflection driving tube 102 and a grid 104 of the deflection driving tube 102. The normal deflection signals are supplied by a generator 106 to the upper end of a grid leak resistor 107 that is connected to the grid 104. In this way the D. C. output of the frequency discriminator 98 is either added to or subtracted from the normal deflection signals so as to make the current in the deflection coils 109 that are coupled to the output of the driving tube 102 via a transformer 108 change in a linear fashion.

I claim:

1. Cathode ray tube apparatus comprising in combination a plurality of electron guns, the electrons projected by one of said guns having a different velocity than the electrons projected by another of said guns, common means for subjecting the beams projected by all of said guns to deflection forces so that said beams scan rasters of different sizes, a plurality of targets toward which said beams of electrons are projected, the targets having characteristics such that successive targets are reached by electrons of a greater velocity than the velocity of the electrons that reached the preceding target.

2. Cathode ray tube apparatus comprising in combination a plurality of electron guns, the electrons projected by each of said guns having a different velocity than the electrons projected by the other of said guns, means for subjecting the beams projected by all of said guns to common deflection forces so that the beams scan at different rates, a plurality of targets toward which said beams of electrons are projected, the targets having characteristics such that successive targets are reached by electrons of a greater velocity than the velocity of the electrons that reached only the preceding targets.

3. A cathode ray tube as described in claim 2 in which a grid of carbon lines is printed on the inner surface of the innermost of said targets.

4. A cathode ray tube as described in claim 2 in which an electron barrier is placed on the inner side of each of said targets.

5. A cathode ray tube as described in claim 4 in which said barrier is comprised of aluminum foil.

6. A cathode ray tube as described in claim 4 in which a grid of carbon lines is printed on the inner surface of the innermost barrier.

7. A cathode ray tube as described in claim 5 in which carbon lines are printed on the inner surface of innermost aluminum foil.

8. A cathode ray tube comprising in combination first and second electron guns, said first gun being adapted to project electrons at a greater velocity than said second gun, a first target toward which said electrons are directed, a second target comprised of a grid, said second target being mounted between said guns and said first target, and an electron velocity barrier mounted between said first and second targets.

9. In combination with apparatus as described in claim 7 filtering means to which said second target is connected, said filtering means being adapted to pass energy of a frequency equal to that of the signals produced when the electrons from said second gun traverse said second target in linear fashion, a frequency discriminator to which the output of said filter is applied, a source of deflection energy connected to said common deflection means, and means for combining the output of said discriminator with said deflection energy in such polarity as to improve the scanning linearity.

10. Apparatus for modulating the intensity of a beam of electrons with one of a plurality of signals comprising in combination a cathode ray tube having first and second electron guns, said first gun being adapted to project electrons at a greater velocity than said second gun, a target toward which said electrons are projected, a grid mounted between said target and said electron guns, a plurality of sources of signals, a gate circuit to which each of said sources are connected, a frequency selective means connected to receive signals generated by said grid, means for delaying the control signals supplied by said frequency selective means for predetermined intervals, connections for applying said control signals to one of said gates, and connections for applying each of said delayed control signals to separate gates, the outputs of said gates being applied so as to control the intensity of the beam of electrons projected by said first electron gun.

11. Apparatus for applying one of a plurality of signals so as to modulate the intensity of a beam of electrons in accordance with the position of said beam comprising in combination a cathode ray tube having first and second electron guns, each of said guns having a cathode, means for establishing the cathode of said first electron gun at a potential that is different than the potential of the cathode of said second electron gun, a first target comprised of vertical strips of phosphor, a second target comprised of a grid of vertical rods, an electron barrier made of material having a different coefficient of secondary emission than said vertical rods mounted between said targets, means for deriving a signal in response to the secondary emission produced by said rods, frequency selective means connected to receive said signals, said frequency selective means being adapted to pass signals having a frequency coincident with the frequency of those of said signals that are produced by the scanning of said first beam of electrons as it scans said second target, a plurality of sources of continuous signals, and means for sequentially keying said sources in response to the signals provided by said frequency selective means.

12. An apparatus as described in claim 11 in which said sequential keying means is comprised of a plurality of gates, each of said continuous signals being applied to a different one of said gates, the output of said frequency selective means being applied to render one of said gates capable of passing the continuous signals applied to it, and means for applying the signals supplied by said frequency selective means to each of said other gates at successive instants of time.

13. Apparatus for modulating a scanning beam of electrons with one of a plurality of signals, the signal selected depending on the position of said beam comprising in combination a cathode ray tube having first and second electron guns, said first guns being adapted to project electrons at a different velocity than said second gun, scanning means adapted to act on said beams, a grid mounted so as to intercept at least one of said beams so as to emit groups of secondary electrons at a given frequency, means for deriving pulses of current in response to the emission of said secondary electrons, frequency responsive means adapted to select said pulses, and gating means adapted to be triggered by the pulses thus selected so as to sequentially apply said signals in such manner as to modulate the intensity of the beam of electrons projected by said second gun.

14. Apparatus adapted to modulate a beam of electrons with one of a plurality of signals depending on the position of the beam comprising in combination means for projecting a first beam of electrons so that it penetrates a desired target, means for projecting a second beam of electrons so that it strikes a grid mounted on the near side of said target, means adapted to cause said beam to scan at a predetermined speed, a plurality of sources of signals, a grid for modulating the intensity of said first beam of electrons, gate circuits connected to each of said sources, and circuits for controlling said gate circuits in response to the signals generated when said second beam strikes said grid.

15. Apparatus as described in claim 14 in which said circuits are comprised of a frequency selector adapted to pass the signals having a frequency equal to that at which signals are produced by said second beam of electrons as it passes over said grid, and means for applying said signal to said gates during successive intervals.

FREDERICK H. NICOLL.

REFERENCES CITED

The following references are of record in the file of this patent:

UNITED STATES PATENTS

| Number | Name | Date |
|---|---|---|
| 2,179,205 | Toulon | Nov. 7, 1939 |
| 2,259,506 | Young et al. | Oct. 21, 1941 |
| 2,440,301 | Sharpe | Apr. 27, 1948 |
| 2,481,839 | Goldsmith | Sept. 13, 1949 |
| 2,543,477 | Sziklai et al. | Feb. 27, 1951 |